April 5, 1966     W. T. FLEMING     3,244,263
OVERRUNNING CLUTCH
Filed Feb. 27, 1964

INVENTOR.
WILLIAM FLEMING
BY
*Ernest A. Jensen*
ATTORNEY

United States Patent Office 3,244,263
Patented Apr. 5, 1966

3,244,263
OVERRUNNING CLUTCH
William T. Fleming, Boonton, N.J., assignor to Specialties Development Corporation, Belleville, N.J., a corporation of New Jersey
Filed Feb. 27, 1964, Ser. No. 347,729
2 Claims. (Cl. 192—41)

The present invention relates to clutches, and more particularly to an improved clutch of the one way engaging or so-called overrunning type.

Accordingly, an object of the present invention is to provide an improved overrunning clutch wherein a ball screw and nut arrangement is utilized to control the engagement of the clutch surfaces.

Another object is to provide such a clutch which is compact and relatively small in size but yet has a high torque capacity and operating speed.

Another object is to provide such a clutch which includes first and second members relatively rotatable in either direction, the first member being adapted to be driven in one direction to drive the second and the second member being adapted to be driven in the opposite direction to drive the first member.

Another object is to provide such a clutch which can be retained in an overrunning condition and released at will to effect clutching of the rotatable members.

Another object is to provide such a clutch which is constructed of a minimum number of parts adapted to be assembled in a convenient manner.

Another object is to provide such a clutch which is readily inspected and repaired.

A further object is to accomplish the foregoing objects in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a clutch which comprises an inner member, an outer member, bearing means for rotatably mounting the outer member on the inner member, the inner member having a ball screw section at one end provided with external helical groove convolutions, a ball screw nut concentrically arranged on the screw section and having internal helical groove convolutions cooperating with the external groove convolutions to provide a helical path, balls confined in the path, the outer member having an annular clutch surface facing the nut and the nut having an annular clutch surface facing the surface on the outer member, and spring means connected to the inner member and the nut to establish a yieldable driving connection therebetween.

A preferred embodiment of the invention has been chosen for purposes of illustration and description, and is shown in the accompanying drawings, forming a part of the specification, wherein.

Figure 1:
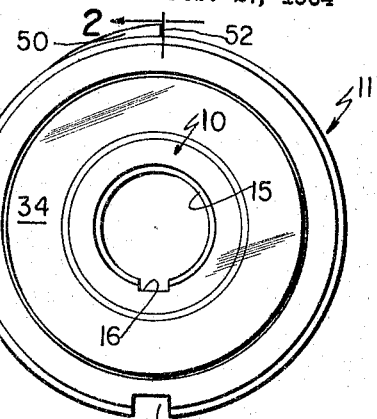
FIG. 1 is an end elevational view of a clutch in accordance with the present invention.
Figure 2:
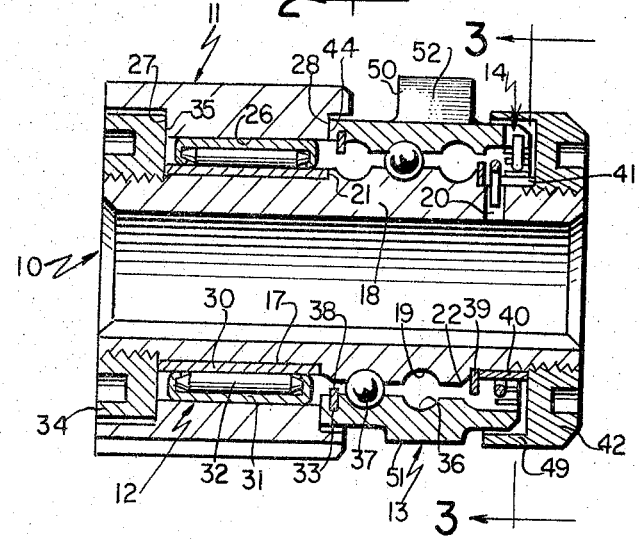
FIG. 2 is a sectional view taken along the line 2—2 on FIG. 1.

Referring now to the drawing in detail, an overrunning clutch is shown which generally comprises an inner member 10, an outer member 11, a bearing assembly 12, a ball screw nut 13, and an arrangement 14 for establishing a driving connection between the nut and the inner member.

The inner member 10 is generally cylindrical and has an axial bore 15 for receiving a shaft (not shown) which bore is formed with a keyway 16 for the reception of a key (not shown) adapted to connect the shaft and the inner member for rotation with each other. One end of the inner member has a cylindrical external surface 17 formed with screw threads at its free end; and the other end has a ball screw section 18 provided with external helical groove convolutions 19 and has screw threads at its free end. A radial extending slot or opening 20, is provided between the last mentioned threads and the outermost groove convolution. The inner member is further provided with shoulders 21 and 22 at the innermost and outermost groove convolutions, respectively.

The outer member 11 likewise is generally cylindrical; and has an external surface 24 for receiving the hub of a rotatable element (not shown) which surface is formed with a keyway 25 for the reception of a key (not shown) adapted to connect the element and the outer member for rotation with each other. The outer member further is provided with an internal bore 26 spaced from and facing the surface 17 of the inner member, an annular outwardly facing thrust bearing surface 27 at the outer end of the bore 26, and an annular surface 28 at the outer end of the bore 26 facing the nut 13 and serving as a clutch face.

The bearing assembly 12 is disposed between the surfaces 17 and bore 26 to rotatably mount the outer member 11 on the inner member 10; and includes a sleeve 30 supported on the surface 17, an annular bearing cage 31 fitted into the bore 26, and needle bearing 32 rotatably supported by the cage and in rolling contact with the sleeve 30. The outer member 11 and the sleeve 30 are retained on the inner member by a ring-shaped nut 34 threaded onto the outer end of the inner member to position the inner end of the sleeve 30 against the shoulder 21. The nut 34 has an annular inwardly facing thrust bearing surface 35 for cooperation with bearing surface 27 and for engaging the outer edge of the sleeve 30 to urge it inwardly.

The ball screw nut 13 is concentrically arranged on the screw section 18 and has internal helical groove convolutions 36 cooperating with the convolutions 19 to provide a helical path for confining ball bearings 37. The tends of this path are closed to prevent the escape of ball bearings by a ring or washer 38 snapped in a recess 33 on the nut at the innermost groove convolution, and a washer 39 seated on the shoulder 22 and held in place by the inner end of a collar 40 fitted on the screw section 18 inner member 11 outwardly of its convolutions 19. The collar 40 is split or is formed with a slot 41 at and in alignment with the slot 20, and is held in place by a ringshaped nut 42 threaded onto the outer end of the screw section 18.

Figure 3:
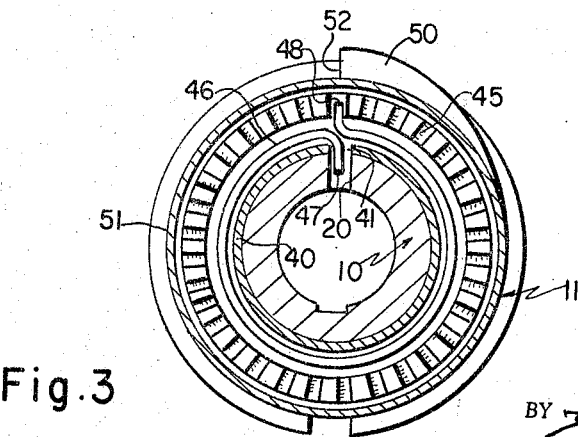
FIG. 3 is a sectional view taken along the line 3—3 on FIG. 2.

The nut 13 further has an annular inner end surface 44 facing the surface 28 and serving as a clutch face for cooperation with the clutch face provided by the surface 28; and has an annular zone of circumferentially spaced axially extending recesses 45 (FIG. 3) at its outer end.

The arrangement 14, in addition to the elements already described, includes a circular or helical spring member 46 having a radially inwardly extending end 47 seated in the slots 20 and 41 and having a radially outwardly extending end 48 seated in one of the recesses 45 to provide a yieldable driving connection between the inner member 10 and the nut 13. The spring 46 is housed in an annular space between the collar 40 and the zone provided with the recesses 45, and the torsion of this spring can be adjusted by selectively seating its end 48 in a desired recess 45. Preferably, the nut 42 has a thin inwardly extending cylindrical extension or skirt 49 surrounding the zone in which the recesses 45 are provided to conceal these recesses and the end 48 of the spring 46.

In the operation of the clutch so far described, when the inner member 10 is the driving member and the outer member 11 is the driven member, the inner member is rotated in a clockwise direction; and, when the outer member 11 is the driving member and the inner member 10 is the driven member, the outer member is rotated in a counterclockwise direction. In either mode of operation, the ball screw nut arrangement allows the spring 46 to be unwound and causes the clutch faces 28 and 44 to engage and connect the inner and outer members so that one member drives the other. When rotation of the driving member ceases, the spring 46 winds up, the nut 13 backs off slightly and allows one of the faces 28 and 44 to override the other.

When either the inner member 10 or the outer member 11 is the driving member and is rotated in the opposite direction as just described, the nut 13 is moved outwardly to position the clutch faces 28 and 44 so that the inner and outer members override each other.

The clutch faces 28 and 44 need only be moved a minute distance when over-running is desired, whereby only a slight turn of the nut 13 is required to effect clutching engagement by rotation of the respective driving member in its clutch operating direction. Also, a clutch having parts relatively dimensioned as shown herein has a torque capacity of about 300 pound inch with clutch faces having an outer diameter of only about one inch; and the inner member 10 can over-run at 4200 r.p.m. and the outer member can over-run at 3600 r.p.m.

The clutch illustrated herein can be modified to control the nut 13 to prevent the faces 28 and 44 from being in clutching engagement until desired. For example, when the outer member 11 is the driving member and is rotated clockwise as viewed in FIG. 1, a suitable arrangement for the foregoing purpose includes a formation 50 on a generally circular surface 51 of the nut 13 having a radially extending stop face 52 adapted to be engaged by a mechanically controlled latch (not shown) and having an involute surface 54 extending from the circular surface 51 to the face 52. Thus, while the latch engages the face 52, the nut 13 cannot turn and is threaded inwardly on thread section 18 to position the clutch faces 28 and 44 to allow the inner and outer members to override each other until the latch releases the nut.

From the foregoing description, it will be seen that the present invention provides an improved over-running clutch which is extremely compact in construction and comprises parts capable of being made by mass production methods and adapted to be readily assembled.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A clutch of the class described comprising an inner cylindrical member having flange means at one end provided with an inwardly facing annular surface and having a ball screw section at its other end provided with external helical groove convolutions; an outer member on said inner member having an outwardly facing annular bearing surface at one end in contact with said inwardly facing bearing surface and having an inwardly facing annular clutch face at its other end; roller bearing means for rotatably mounting said outer member on said inner member; a ball screw nut concentrically arranged on said ball screw section and having internal helical groove convolutions cooperating with said external groove convolutions to provide a helical path, said ball screw nut having an inwardly facing annular clutch face at one end for engaging said clutch face of said outer member and having a slot at its other end and having an external formation adapted to be engaged to restrain rotation thereof; balls in said path; means at the ends of said path for confining said balls in said path; a nut member removably secured to the other end of said outer member and having an inwardly facing annular zone of circumferentially spaced axially extending recesses; and a circular torsion spring having its inner end positioned in said slot and having its outer end positioned in one of said recesses to provide a yieldable driving connection between said nut member and said ball screw nut.

2. A clutch according to claim 1, wherein said nut member has an inwardly facing cylindrical extension surrounding the outer end of said ball screw nut and said zone of recesses to conceal said spring.

References Cited by the Examiner

UNITED STATES PATENTS

| | | | |
|---|---|---|---|
| 762,802 | 6/1904 | Casgrain | 192—24 |
| 1,582,311 | 4/1926 | Schull | 192—24 |
| 1,810,317 | 6/1931 | Lasker | 192—24 |
| 1,922,350 | 8/1933 | Bolton | 192—41 |
| 2,873,833 | 2/1959 | Hogan | 192—41 |

DAVID J. WILLIAMOWSKY, *Primary Examiner.*